3,109,029
PREPARATION OF TRIALLYLBORINE
Earl A. Weilmuenster, Kenmore, N.Y., assignor, by mesne assignments, to Olin Mathieson Chemical Corporation, a corporation of Virginia
No Drawing. Filed July 1, 1955, Ser. No. 519,608
1 Claim. (Cl. 260—606.5)

My invention relates to the production of triallylborine as a new composition of matter.

Although several trialkylborines have been previously reported, triallylborine is the only substituted borine containing carbon-carbon double bonds. The new composition may be prepared by reaction of the Grignard reagent of allyl chloride and boron trifluoride etherate.

The new composition is a clear liquid which readily oxidizes upon exposure to atmospheric oxygen. It has potential value as an olefinic polymerization agent, particularly since the unsaturated linkage in the triallylborine molecule permits it to enter into the polymerization reaction, and hence modifies the structure and properties of resulting polymer. The new composition is a useful intermediate in the preparation of other organoboron derivatives. It also has potential value as a fuel or as an additive to fuels in view of its relatively high heat of combustion and its effect on fuel properties such as flash point, flame speed and the like.

The following experimental example illustrates preparation of the triallylborine.

A three liter flask, fitted with stirrer, addition funnel and condenser, was charged with 50 grams (2.06 moles) of magnesium turnings and swept with dry nitrogen for ten minutes, after which 400 ml. of ether was added to the flask.

A mixture of 152 grams (1.98 moles) of allyl chloride (B.P. 44.2°/760.1 mm.) in 400 ml. of ether was added to the flask over a period of eight hours. During this time 360 ml. of additional ether was added to facilitate stirring.

To the mixture containing allylmagnesium chloride was added 65 grams (0.46 mole) of boron trifluoride etherate in 350 ml. of ether. Cooling in an ice bath was necessary initially to control the rate of ether reflux. After the addition was completed, the mixture was heated under reflux for forty-five minutes. Following separation of the ether solution from the precipitated solids, the ether was removed by distillation, and the residue was fractionated. The product was collected at 58–60°/19–22 mm. The yield was 29 grams (47 percent).

Analysis.—Calcd. for $C_9H_{15}B$: C, 80.7; H, 11.2; B, 8.1. Found: C, 73.45, 73.21; H, 10.44, 10.24; B, 8.44, 8.52.

The composition of my invention can be employed as a fuel when burned with air. Thus, it can be used as a fuel in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The product of my invention is particularly suited for use as a fuel in the combustors of aircraft gas turbines of the types described in view of its improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The product of my invention is well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuel of the present invention, the local fuel to air ratio in the zone of fuel injection should also be approximately stoichiometric, assuming that the boron, carbon and hydrogen present in the products burn to boric oxide, carbon dioxide and water vapor. In the case of triallylborine this local fuel to air ratio by weight is approximately 0.075. For the higher energy fuel of the present invention, because of its higher heating value in comparison with the simple hydrocarbons, the overall fuel-air ratio by weight across the combustor will be approximately 0.010 to 0.025 if the resultant gas temperature is to remain within the presently established tolerable temperature limits. Thus, when used as the fuel supplied to the combustor of an aircraft gas turbine engine, the product of the present invention is employed in essentially the same manner as the simple hydrocarbon fuel presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600–1650° F. Operations at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The product of my invention can also be employed as aircraft gas turbine fuel in admixture with the hydrocarbons presently being used, such as JP–4. When such mixtures are used, the fuel-air ratio in the zone of the combustor where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of its high chemical reactivity and heating values, the product of my invention can be employed as fuel in ramjet engines and in afterburning and other auxiliary burning schemes for the turbojet and bypass or ducted types engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme conditions of altitude operations with conventional aircraft fuels.

The burning characteristics of the product of my invention are such that good combustion performance can be attained even at the marginal operating conditions encountered at high altitudes, insuring efficient and stable combustion and improvement in the zone of operation before lean and rich extinction of the combustion process is encountered. Significant improvements in the non-afterburning performance of a gas turbine-afterburner combination is also possible because the high chemical reactivity of the product of my invention eliminates the need of flameholding devices within the combustion zone of the afterburner. When employed in an afterburner, the fuel of my invention is simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The product of my invention will improve the combustion process of the ramjet in much the same manner as that described for the afterburner because of its improved chemical reactivity over that of simple hydrocarbon fuels. When employed in a ramjet the fuel of my invention will be simply substituted for hydrocarbon fuels and used in the established manner.

This application is a continuation-in-part of my copending application Serial No. 382,181, filed September 24, 1953, later abandoned.

I claim:

A method for the preparation of triallylborine which comprises refluxing allyl magnesium chloride and boron trifluoride etherate in ether solution to produce triallylborine and precipitated solids, and distilling the ether layer thus formed to recover triallylborine therefrom.

References Cited in the file of this patent

Johnson et al.: American Chemical Society Journal, volume 60, pages 115–118 (1938).

Rothstein et al.: J. Chemical Society, pages 2987–2991.